(12) United States Patent
Mannering et al.

(10) Patent No.: US 11,955,011 B2
(45) Date of Patent: Apr. 9, 2024

(54) LiDAR VESSEL-TO-VESSEL DOCKING SYSTEM AND METHOD

(71) Applicant: CASHMAN DREDGING AND MARINE CONTRACTING, CO., LLC, Quincy, MA (US)

(72) Inventors: Timothy Mannering, Marshfield, MA (US); Jay Cashman, Quincy, MA (US)

(73) Assignee: CASHMAN DREDGING AND MARINE CONTRACTING, CO., LLC, Quincy, MA (US)

(*) Notice: Subject to any disclaimer, the term of this patent is extended or adjusted under 35 U.S.C. 154(b) by 279 days.

(21) Appl. No.: 17/207,846

(22) Filed: Mar. 22, 2021

(65) Prior Publication Data
US 2021/0295709 A1    Sep. 23, 2021

Related U.S. Application Data

(60) Provisional application No. 62/992,258, filed on Mar. 20, 2020.

(51) Int. Cl.
| | | |
|---|---|---|
| *G08G 3/02* | (2006.01) | |
| *B63B 49/00* | (2006.01) | |
| *G01S 17/08* | (2006.01) | |
| *G01S 17/93* | (2020.01) | |
| *G05D 1/00* | (2006.01) | |
| *G05D 1/02* | (2020.01) | |

(52) U.S. Cl.
CPC ............. *G08G 3/02* (2013.01); *B63B 49/00* (2013.01); *G01S 17/08* (2013.01); *G01S 17/93* (2013.01); *G05D 1/0206* (2013.01); *B63B 2203/00* (2013.01)

(58) Field of Classification Search
None
See application file for complete search history.

(56) References Cited

U.S. PATENT DOCUMENTS

| | | | | |
|---|---|---|---|---|
| 5,781,147 A | * | 7/1998 | Elliott | G01S 13/865 342/54 |
| 2016/0266247 A1 | | 9/2016 | Hjelmstad | |
| 2018/0004209 A1 | | 1/2018 | Akuzawa et al. | |
| 2019/0155288 A1 | * | 5/2019 | Arbuckle | B63B 79/15 |
| 2019/0258258 A1 | * | 8/2019 | Tyers | G01S 19/13 |

(Continued)

FOREIGN PATENT DOCUMENTS

| | | | | |
|---|---|---|---|---|
| CA | 3101609 A1 | * | 12/2019 | B63B 49/00 |
| CN | 110029645 A | * | 7/2019 | |
| CN | 110087985 A | * | 8/2019 | B63B 21/00 |

(Continued)

*Primary Examiner* — Fekadeselassie Girma
(74) *Attorney, Agent, or Firm* — Jacob M. Ward; Ward Law Office LLC

(57) ABSTRACT

A vessel docking system has a vessel such as a scow and/or a tugboat, a platform such as a barge and/or a dredger, an optical distance measuring means, a vessel display unit, and a control means. The vessel display unit is configured to display a position and a location of the vessel and/or the platform. The optical distance measuring means is in communication with the vessel display unit. The optical distance measuring means includes a sensor, a laser, and lens. The optical distance measuring means is configured to determine a distance and a pathway between the platform and the vessel.

17 Claims, 4 Drawing Sheets

(56) References Cited

U.S. PATENT DOCUMENTS

2020/0042004 A1     2/2020  Fujiyama et al.
2022/0206496 A1 *   6/2022  Tyers .................. G01C 21/203

FOREIGN PATENT DOCUMENTS

| | | | | |
|---|---|---|---|---|
| CN | 209589122 U * | 11/2019 | | |
| EP | 4020430 A1 * | 6/2022 | | |
| JP | H0174582 U * | 5/1989 | | |
| JP | 3863747 B2 * | 12/2006 | | |
| JP | 2021062748 A * | 4/2021 | | |
| KR | 20110059206 A * | 6/2011 | ............ | B63B 35/66 |
| WO | WO-0171489 A1 * | 9/2001 | ............ | G06F 9/451 |
| WO | WO-2018004353 A1 * | 1/2018 | ............ | B63B 21/56 |
| WO | WO-2019017919 A1 * | 1/2019 | ............ | B63B 35/66 |
| WO | WO-2020075393 A1 * | 4/2020 | ............ | B63B 49/00 |
| WO | WO-2021075319 A1 * | 4/2021 | | |

* cited by examiner

LiDAR VESSEL-TO-VESSEL DOCKING SYSTEM AND METHOD

CROSS-REFERENCE TO RELATED APPLICATIONS

This application claims the benefit of U.S. Provisional Application. No. 62/992,258 filed on Mar. 20, 2020. The entire disclosure of the above application is incorporated herein by reference.

FIELD

The present disclosure relates to dredging, and more particularly, docking a scow to a dredger.

INTRODUCTION

This section provides background information related to the present disclosure which is not necessarily prior art.

Generally, a scow is brought to a dredger by being moved by a tugboat. A first side of the scow is coupled to a first side of the tugboat, thereby allowing it to be moved to the dredger. Undesirably, this setup can lead to difficulties in docking the scow to the dredger. For example, the sightline from the tugboat to the dredger may be severely obstructed by the scow. For instance, where the scow is larger and taller than the tugboat, the scow can completely block the dredger from the field of view of the tugboat operator.

Problems with the sightline between the tugboat and the dredger can be overcome by having a deckhand climb from the tugboat to the top of the scow. The deckhand then guides the tugboat movements by communicating the distance, speed, and direction to the captain of the tugboat via a radio. This way of guiding the tugboat gives rise to certain problems. First, there may be damage to one or more of the vessels involved resulting from an unsuccessful docking attempt. This can be caused by poor or late distance and speed estimates by the deckhand. Second, the deckhand may be placed in a hazardous situation. As mentioned previously, the deckhand must climb from the tugboat to the top of the scow while the vessels are being moved. The top of the scow may be as tall as twenty (20) feet above the water surface. The conditions of climbing to such heights across moving vessels may poise concerns for slips, falls, and other undesirable outcomes. Third, using the deckhand as a reporting intermediary can be time consuming. The captain of the tugboat must wait for the deckhand to get into position and then must communicate with the deckhand to dock the scow to the dredger. This may negatively impact the efficiency of the docking process.

There is a continuing need for a docking system and method for docking a scow, being moved by a vessel such as a tugboat, to a dredger. Desirably, the system and method does not require direct sightline from the vessel to the dredger.

SUMMARY

In concordance with the instant disclosure, a docking system and method for docking a scow, coupled to a vessel such as a tugboat, to a dredger, and which does not require sightline from the vessel to the dredger, has been surprisingly discovered.

A docking system is provided that includes a platform, a vessel, an optical distance measuring means, a vessel display unit, and a control means. The optical distance measuring means may be configured to determine a position of one of the platform and the vessel relative to the other of the platform and the vessel. The vessel display unit may be configured to display the position. The control means may be configured to adjust a location of the vessel.

Various processes of using the docking system are provided. In such methods, the docking system may be provided with a platform, a vessel, an optical distance measuring means, a vessel display unit, and a control means. The location and the position of one of the platform and the vessel relative to the other of the platform and the vessel may be acquired by the optical distance measuring means. The location and the position of one of the platform and the vessel relative to the other of the platform and the vessel may be displayed by the vessel display unit. The location and the position of one of the platform and the vessel relative to the other of the platform and the vessel may be adjusted by the control means.

In this way, the present system and method may account for changes in various locations, positions, and pathways when docking vessels to the platform. The accounting of optimal pathways for docking vessels to the platform may provide efficient use of equipment, whether by a human operator or by automated operation of the equipment.

Further areas of applicability will become apparent from the description provided herein. It should be understood that the description and specific examples are intended for purposes of illustration only and are not intended to limit the scope of the present disclosure.

DRAWINGS

The above, as well as other advantages of the present disclosure, will become readily apparent to those skilled in the art from the following detailed description, particularly when considered in the light of the drawings described herein.

DETAILED DESCRIPTION

Figure 1:
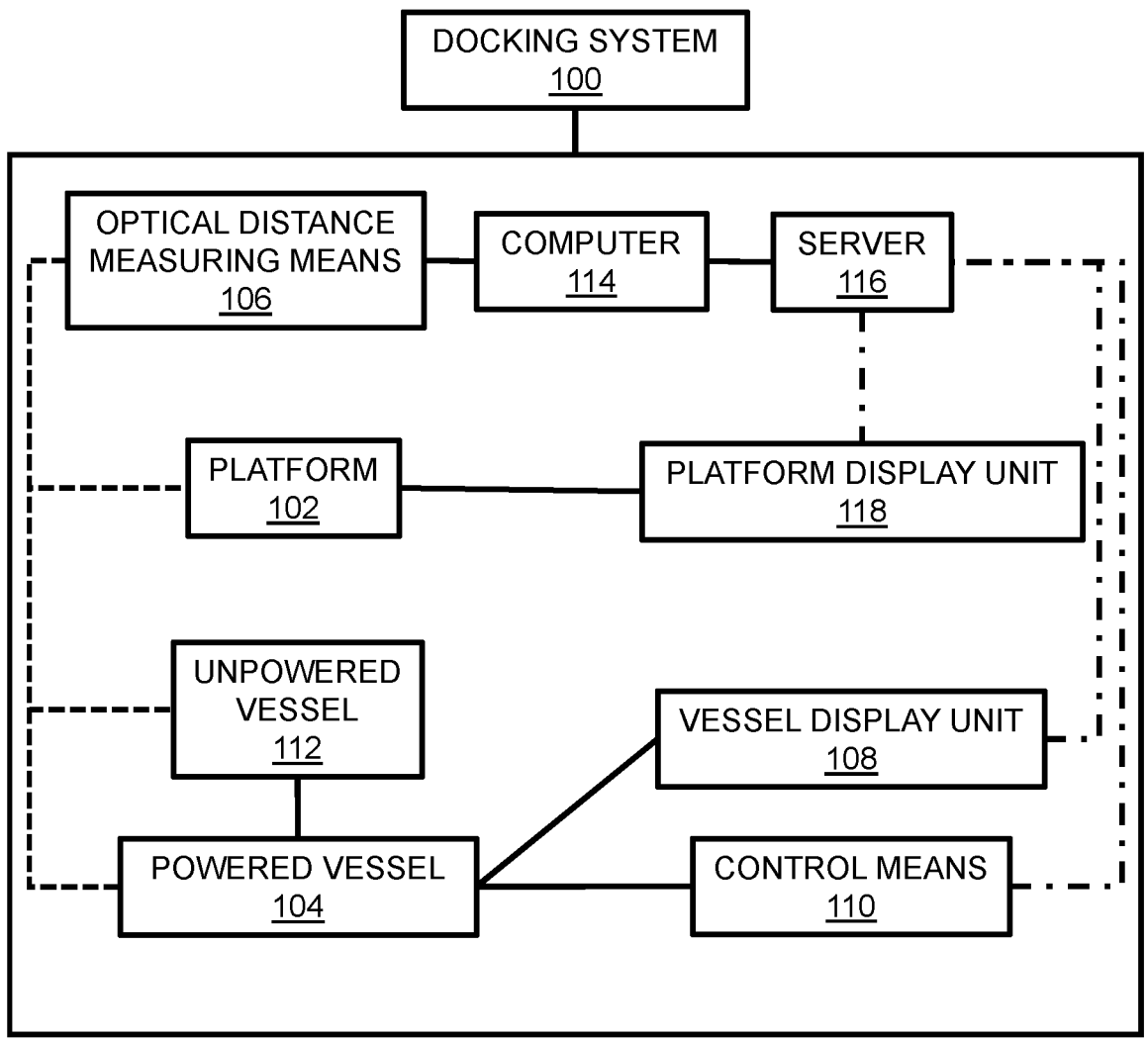
FIG. 1 is a schematic illustration of components of a docking system.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology is drawn to a docking system that includes a platform, a vessel, an optical distance measuring means, a vessel display unit, and a control means. The optical distance measuring means may be configured to determine a position and a location of one of the platform and the vessel relative to the other of the platform and the vessel. The position may relate to the directional orientation of the platform(s) or the vessel(s). The vessel display unit may be configured to display the position. For example, the position can include information relative to the shape of the vessel, the direction in which the vessel is pointed, a rotation of the vessel, as well as other positional details with respect to the vessel geometry. The control means may be configured to adjust the location of the vessel. The location may relate to the geographical coordinates of the platform(s) and the vessel(s). For example, the location can include a location determined by a global positioning system or other mapping system. The vessel may further include a powered vessel and an unpowered vessel coupled to the powered vessel.

The platform may include various types of equipment. Certain embodiments include where the platform is one of a dock coupled to a surface of the earth and a floating barge. In a specific example, the platform may be a floating barge with a dredging device disposed thereon.

The vessel may include a powered vessel and an unpowered vessel. The powered vessel and the unpowered vessel may include various types of equipment. The powered vessel is capable of moving under its own power, whereas the unpowered vessel cannot move under its own power. For example, where the powered vessel is coupled to the unpowered vessel, the powered vessel can be used to move the unpowered vessel. Certain embodiments include where the powered vessel is a watercraft that includes a propulsion system. In a specific example, the powered vessel may include a tugboat and the unpowered vessel may include a scow.

The optical distance measuring means can have certain functionalities that can be performed by various types of equipment. Embodiments may include where the optical distance measuring means is configured to determine the position, a location, and a rate of speed of the platform, and the vessel. In a specific example, the optical distance measuring means may be further configured to determine a map of the pathway between the vessel and the docking position. In a specific, non-limiting example, the map may be a two-dimensional map or a three-dimensional map. The map may be determined in real time. One example of the optical distance measuring means includes a Light Detection and Ranging (LiDAR) module. Where the optical distance measuring means locates a position and a location of at least one of the platform, and the vessel. An accurate position and location of the vessel and/or the pathway between the vessel and the docked position can be determined in response to any position and/or location changes in the system and/or environment.

The control means may have certain functionalities that may be performed by various types of equipment. For example, the control means may be configured to adjust the position and/or the location of the vessel within a predetermined range of the optical distance measuring means. In a more specific example, the control means may include a propulsion system and a way to change the directional heading of the powered vessel. The control means can therefore operate the powered vessel to move under its own power. The control means may further include manual controls for use by a human operator and/or automated controls for operation by a computer system including a processor and a non-transitory computer-readable storage medium. In certain embodiments, the control means may include a non-transitory computer-readable storage medium having encoded thereon one or more predetermined sets of instructions that, when executed by a computer, cause the computer to perform one or more methods or cycles of methods and/or method steps as described herein.

The vessel display unit may have certain functionalities that may be performed by various types of equipment. For example, the vessel display unit may be configured to cooperate with the optical distance measuring means to provide a trajectory of one of the platform and the vessel relative to each other. The trajectory may include information such as a location, a position, a heading, and a rate of speed of each of the platform and the vessel, where the vessel may include the unpowered vessel and the powered vessel. In a specific example, the vessel display unit and the optical distance measuring means may further cooperate to identify an azimuth of the vessel in relation to the platform. As non-limiting examples, the vessel display unit may include electroluminescent displays (ELD), liquid crystal displays (LCD), light emitting diode displays (LED), and plasma displays. It should be appreciated that one skilled in the art may select other displays, as required by the current application. A skilled artisan may select other functionalities to incorporate into the vessel display unit, within the scope of the present disclosure.

In certain embodiments, the computer may also include a server. The computer and server may be configured to permit each of the control means, the optical distance measuring means, and the vessel display unit to communicate between each other. The computer and the server may transmit information through one of a wireless radiofrequency signal that utilizes omnidirectional antennas, a Wi-Fi connection, a satellite internet connection, and a real time video feed. Advantageously, the wireless communication of the control means, the optical distance measuring means, and the vessel display unit may enhance the efficiency, accuracy, and repeatability of docking procedures.

As described, the optical distance measuring means can employ LiDAR technology for assisting an operator in docking the vessel in a docked position on the platform. LiDAR may be used to locate and to image objects. The LiDAR module may include a laser, a lens, and a sensor for receiving reflected laser light. LiDAR may measure distances to a target by illuminating the target with laser light and measuring the reflected light with a sensor. Differences in laser return times and wavelengths can be used to make a digital three-dimensional representation of one or more targets, including mapping a predetermined range and a local environment thereof within the predetermined range. A LiDAR unit or module may be in communication with other portions of the systems described herein, including the control means as well as one or more vessel display units used to show a representation of one or more vessels, one or more platforms, one or more obstacle points, one or more pathways between the vessel(s) and the platform(s) for one or more predetermined ranges.

A number of LiDAR modules may be employed and positioned at various points within and around the system, such the LiDAR modules can be scalable by a person skilled in the art, to optimize optical distance measuring for a given docking system configuration. For example, one or more LiDAR modules may be configured to project laser beams within a 180° horizontal field of view (FOV) or one or more LiDAR modules may project laser beams within a 360° horizontal FOV. It should be appreciated that the field of view of the LiDAR module can be adjusted according to the given position and application. In a specific example, multiple LiDAR modules may be disposed on the platform. For example, the platform may have a LiDAR module disposed on each of the stern, the bow, the port, and the starboard sides of the platform. One skilled in the art may select other suitable locations to dispose the optical distance measuring means, within the scope of the present disclosure.

In certain embodiments, the LiDAR module is a VELO-DYNE® PUCK™ available from Velodyne (San Jose, CA). The PUCK™ includes sixteen (16) channels with a range of 100 meters. The PUCK™ may be capable of generating up to 600,000 points per second, across a 360° horizontal FOV and a 30° FOV. The rotations per minute of laser can be adjusted to increase or decrease the number of points obtained by the PUCK™. It should be appreciated that although the VELODYNE® PUCK™ has been shown to be useful, other LiDAR modules may be employed.

In certain embodiments, the unpowered vessel may be disposed substantially between the platform and the powered vessel. A portion of the unpowered vessel may be configured to be disposed alongside a portion of the platform in a docked position. In a specific example, the powered vessel may be configured to move the unpowered vessel into the docked position. In a more specific, non-limiting example, the portion of the unpowered vessel and the portion of the platform may be disposed on complementary elongated sides that may be selectively arranged substantially parallel to one another in the docked position.

In certain embodiments, the optical distance measuring means may be disposed on the platform. By the optical distance measuring means, the vessel may be visualized on the vessel display unit. Where the unpowered vessel is greater in size than the powered vessel, the powered vessel may not have a sightline of the platform. In a specific example, the optical distance measuring means may be disposed on the platform and the vessel display unit may be disposed on the powered vessel. With continued reference to the specific example, the vessel display unit may show the powered vessel in a phantom view, where the powered vessel is obstructed from a direct line of sight by the larger unpowered vessel. In a specific example, the location and the position of the powered vessel may be determined by its placement in relation to the unpowered vessel, where the powered vessel is coupled to the unpowered vessel. Advantageously, the operator may have an enhanced visualization of the location and the position of each of the platform and the vessel, even without the vessel operator having a direct sightline of the platform.

In certain embodiments, the platform may include a platform display unit. The platform display unit may be configured to display a representation of the location and the position of the platform and the vessel, where the vessel may include the unpowered vessel and the powered vessel. Desirably, this permits a user of the platform to visualize the same representation shown on the vessel display unit, thereby allowing both the user of the platform and the vessel operator to communicate while seeing the same information. It is believed that where both parties have access to the same information, the efficiency and accuracy of docking the vessel to the platform will be enhanced.

Turning now the accompanying figures provided herewith, particular embodiments of the present technology are shown.

With reference to FIG. 1, the docking system 100 may include a platform 102, a vessel 104, 112, an optical distance measuring means 106, a vessel display unit 108, and a control means 110. The vessel 104, 112 may further include a powered vessel 104 and an unpowered vessel 112 coupled to the powered vessel 104. The control means 110 may further include a computer 114 and a server 116 that permits communication between the control means, the optical distance measuring means 106, and the vessel display unit 108. The computer 114 and the server 116 may also permit communication to a platform display unit 118 disposed on the platform 102.

Figure 2:
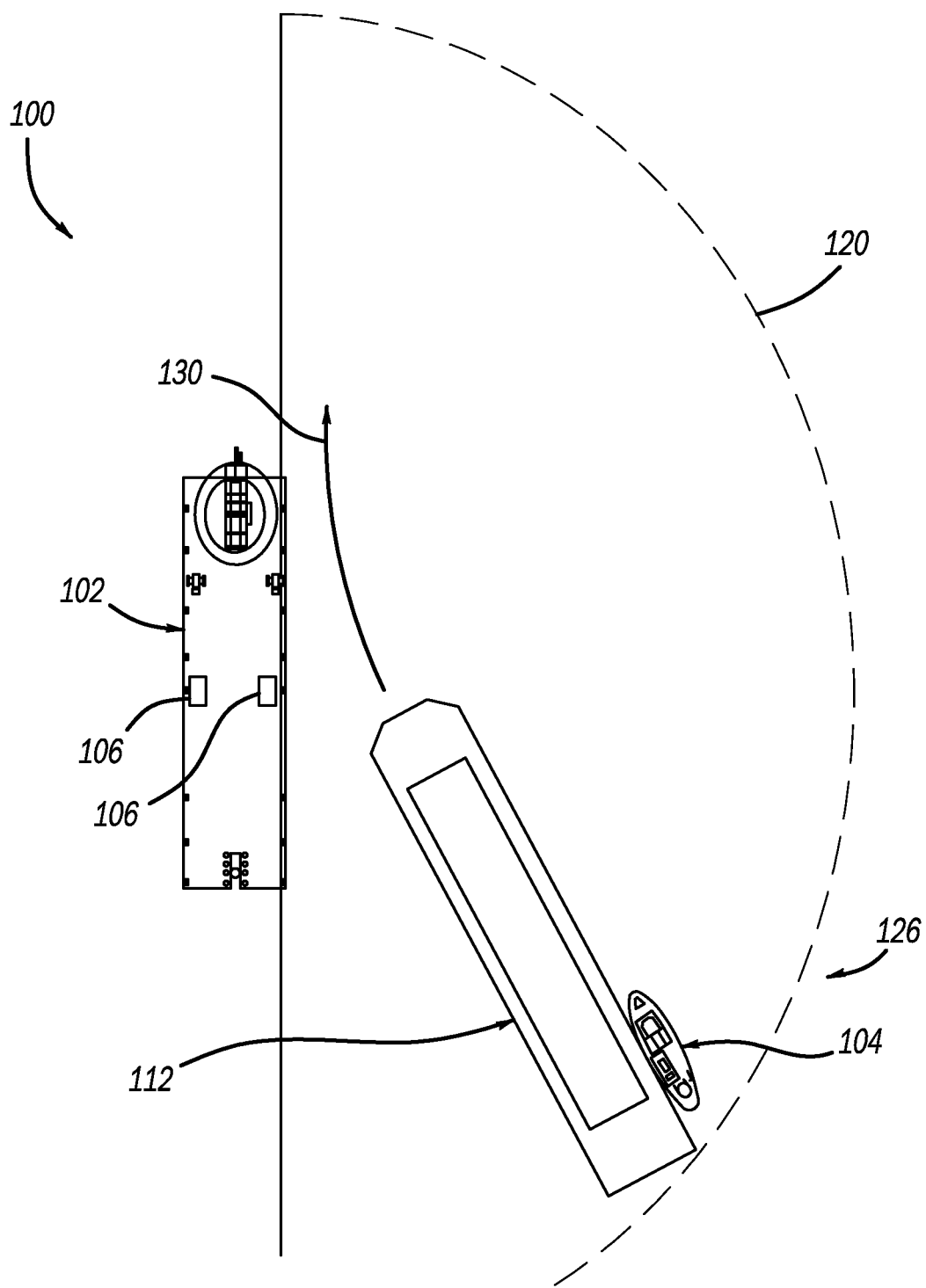
FIG. 2 is a top plan schematic view of the docking system, according to one embodiment of the present disclosure.
Figure 3:
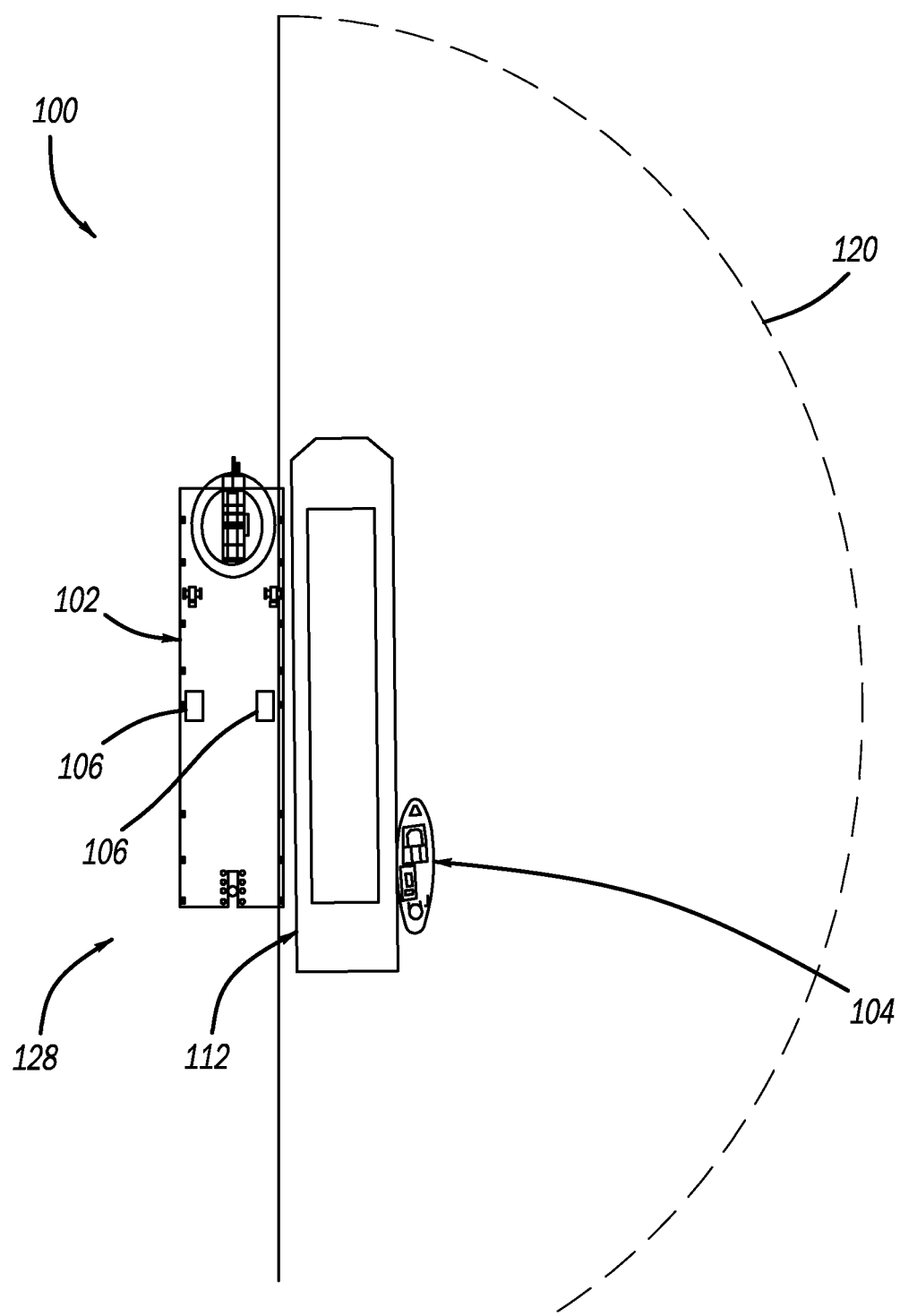
FIG. 3 is a top plan schematic view of the docking system, as shown in FIG. 2, depicted with the vessel disposed in the docked position, according to one embodiment of the present disclosure.

In certain embodiments, as shown in FIGS. 2-3, the optical distance measuring means 106 may have a predetermined range 120. The optical distance measuring means 106 may emit a laser within the predetermined range 120. Where the laser hits a target, such as the vessel 104, 112, a reflected light may be returned back to the optical distance measuring means 106 while the vessel 104, 112 is in an undocked position 126. The docking system 100 may utilize the reflected light 124 to enhance the efficiency and the accuracy of disposing the vessel 104, 112 into a docked position 128.

Figure 4:
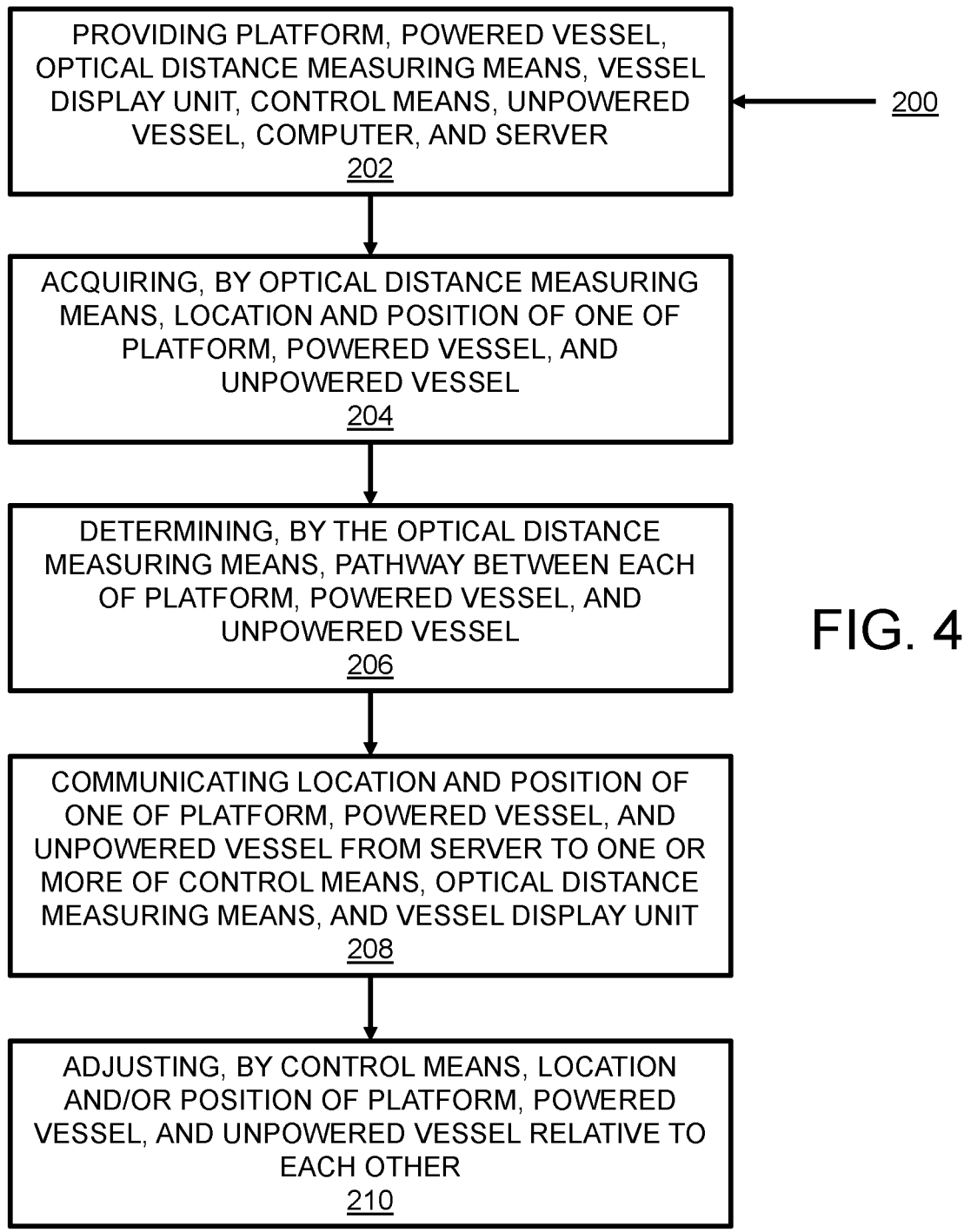
FIG. 4 is a flowchart of a method for using the docking system, according to one embodiment of the present disclosure.

In certain embodiments, as shown in FIG. 4, the present technology may be used according to a method 200 of using the docking system 100. The method 200 may include a step 202 of providing the platform 102, the vessel 104, 112, the optical distance measuring means 106, the vessel display unit 108, and the control means 110. In certain embodiments, the step 202 may also include providing the vessel 104, 112 including a powered vessel 104 and an unpowered vessel 112 coupled to the powered vessel 104. The step 202 may further include providing the computer 114 and the server 116. The method 200 may include a step 204 of acquiring the location and the position of one of the platform 102 and the vessel 104, 112 relative to each other by the optical distance measuring means 106. As shown in FIG. 2, a pathway 130 between each of the platform 102 and the vessel 104, 112 may be determined by the optical distance measuring means 106 in another step 206. In a specific example, the pathway 130 may further include determining an azimuth of the vessel 104, 112 in relation to the platform 102. The method 200 may further include a step 208 of communicating the location and the position of one of the platform 102 and the vessel 104, 112 relative to each other from the server 116 to one of the control means 110, the optical distance measuring means 106, and the vessel display unit 108. The location and the position of the platform 102 and the vessel 104 relative to each other may be displayed by the vessel display unit 108 in another step 210. One of the location and the position of the platform 102 and the vessel 104, 112 relative to each other may be adjusted by the control means 110 in a step 212. In certain embodiments, the location and the position of the platform 102 and the vessel 104, 112 relative to each other may be autonomously adjusted by the control means 110.

Advantageously, a docking system 100 having a platform 102, a vessel 104, 112, an optical distance measuring means 106, a vessel display unit 108, and a control means 110 that may provide a representation of a location and a position of the platform 102 and/or the vessel 104, 112 without a direct sightline from the vessel 104, 112 to the platform 102 may enhance the efficiency, the accuracy, and the repeatability of docking the vessel 104, 112 adjacent to the platform 102.

While certain representative embodiments and details have been shown for purposes of illustrating the invention, it will be apparent to those skilled in the art that various changes can be made without departing from the scope of the disclosure, which is further described in the following appended claims.

What is claimed is:

1. A docking system comprising:
 a platform;
 a vessel;
 an optical distance measuring means configured to determine a position of one of the platform and the vessel relative to the other of the platform and the vessel,
  wherein the optical distance measuring means is configured to cooperate with the vessel display unit to provide a trajectory of one of the platform and the vessel relative to the other of the platform and the vessel,
  wherein the trajectory includes a location, a position, a heading, and a rate of speed, and wherein the optical distance measuring means includes a Light Detection and Ranging (LiDAR) module configured to determine a position and a location of one of the platform and the vessel relative to the other of the platform and the vessel, and
  wherein the optical distance measuring means includes a plurality of LiDAR modules disposed on the platform;
 a vessel display unit configured to display the position; and
 a control means configured to adjust a location of the vessel.

2. The docking system of claim 1, wherein the vessel includes a powered vessel and an unpowered vessel coupled to the powered vessel.

3. The docking system of claim 2, wherein the unpowered vessel is disposed substantially in between the platform and the powered vessel.

4. The docking system of claim 3, wherein a portion of the unpowered vessel is configured to be disposed alongside a portion of the platform in a docked position.

5. The docking system of claim 1, wherein the optical distance measuring means is disposed on the platform.

6. The docking system of claim 1, wherein the optical distance measuring means is further configured to identify a position of one of the platform and the vessel relative to the other of the platform and the vessel, a directional heading of one of the platform and the vessel relative to the other of the platform and the vessel, and a rate of speed of one of the platform and the vessel relative to the other of the platform and the vessel.

7. The docking system of claim 1, wherein the vessel includes the vessel display unit.

8. The docking system of claim 7, wherein the optical distance measuring means includes a computer and a server, the computer is configured to determine the position and the location of one of the platform and the vessel relative to the other of the platform and the vessel, the computer is further configured to transmit the position and the location to the server, the server is configured to translate and transmit the position and the location into instructions for the control means and the vessel display unit.

9. The docking system of claim 8, wherein vessel display unit is configured cooperate with the server to determine a pathway between one of the platform and the vessel relative to the other of the platform and the vessel.

10. The docking system of claim 9, wherein the server, the control means, and the vessel display unit communicate through one of a wireless radiofrequency signal, a Wi-Fi connection, a satellite internet connection, and a real time video feed.

11. A method of using a docking system comprising:
providing a docking system including:
    a platform,
    a vessel,
    an optical distance measuring means configured to determine a location and a position of one of the platform and the vessel relative to the other of the platform and the vessel,
        wherein the optical distance measuring means is configured to cooperate with the vessel display unit to provide a trajectory of one of the platform and the vessel relative to the other of the platform and the vessel,
    wherein the trajectory includes a location, a position, a heading, and a rate of speed, and wherein the optical distance measuring means includes a Light Detection and Ranging (LiDAR) module configured to determine a position and a location of one of the platform and the vessel relative to the other of the platform and the vessel, and
        wherein the optical distance measuring means includes a plurality of LiDAR modules disposed on the platform,
    a vessel display unit configured to display the position, and
    a control means configured to adjust a location of the vessel;
acquiring, by the optical distance measuring means, the location and the position of one of the platform and the vessel relative to the other of the platform and the vessel;
displaying, by the vessel display unit, the location and the position of one of the platform and the vessel relative to the other of the platform and the vessel; and
adjusting, by the control means, at least one of the location and the position of one of the platform and the vessel relative to the other of the platform and the vessel.

12. The method of claim 11, wherein the vessel includes a powered vessel and an unpowered vessel coupled to the powered vessel.

13. The method of claim 12, wherein the unpowered vessel is disposed substantially in between the platform and the powered vessel.

14. The method of claim 11, further comprising a step of determining, by the optical distance measuring means, a pathway between the platform and the vessel, wherein the optical distance measuring means is configured to identify an azimuth of the vessel in relation to the platform.

15. The method of claim 11, wherein the optical distance measuring means includes a computer and a server.

16. The method of claim 15, further comprising a step of communicating the location and the position of one of the platform and the vessel relative to the other of the platform and the vessel from the server to one of the control means and the vessel display unit.

17. The method of claim 11, wherein the at least one of the location and the position of one of the platform and the vessel relative to the other of the platform and the vessel is autonomously adjusted by the control means.

\* \* \* \* \*